United States Patent [19]
Allen

[11] Patent Number: 5,951,231
[45] Date of Patent: Sep. 14, 1999

[54] VEHICLE ROOF RACK AND BOAT MOUNTING SYSTEM

[75] Inventor: Scott R. Allen, McKinleyville, Calif.

[73] Assignee: Yakima Products, Inc., Arcata, Calif.

[21] Appl. No.: 08/895,721

[22] Filed: Jul. 17, 1997

[51] Int. Cl.⁶ ........................................ B60P 9/00

[52] U.S. Cl. ..................... 414/462; 224/309; 224/310; 224/321; 224/324; 280/414.1; 193/35 A

[58] Field of Search ........................ 414/462; 224/309, 224/310, 321, 324, 326; 280/414.1; 193/35 A

[56] References Cited

U.S. PATENT DOCUMENTS

| | | |
|---|---|---|
| 2,816,672 | 12/1957 | Facchini . |
| 3,001,679 | 9/1961 | Canning et al. . |
| 3,155,249 | 11/1964 | Johnson . |
| 3,642,157 | 2/1972 | Williams, Jr. . |
| 3,826,390 | 7/1974 | Watson . |
| 4,717,165 | 1/1988 | Johnson . |
| 4,997,332 | 3/1991 | Johnson . |

*Primary Examiner*—David A. Bucci
*Assistant Examiner*—Douglas Hess
*Attorney, Agent, or Firm*—Kolisch Hartwell Dickinson McCormack & Heuser

[57] ABSTRACT

A vehicle-top roof rack and boat mounting system for mounting a boat atop a roof of a car, the rack and mount is provided with a plurality of roof couplers attachable on the car roof, a plurality of crossbars attachable to the roof couplers, and a boat mounting system comprising a plurality of boat mounts. Each of the boat mounts include a crossbar grip coupled to the crossbar, a mounting frame coupled to the grip, a gimbal coupled to the mounting frame, and a roller support coupled to the gimbal. The gimbal allows the roller support to pivot with two degrees of freedom about a central gimbal point to adapt the mount to variously shaped boat hulls and to the varying curvature of each boat hull. The gimbal also adapts for the angle of loading in a one-person loading/unloading operation. The gimbal also includes a biasing mechanism operating about a first axis of rotation and a stop operating about a second axis of rotation, the biasing mechanism and the stop together putting the roller support in a predetermined neutral position prior to boat loading.

26 Claims, 6 Drawing Sheets

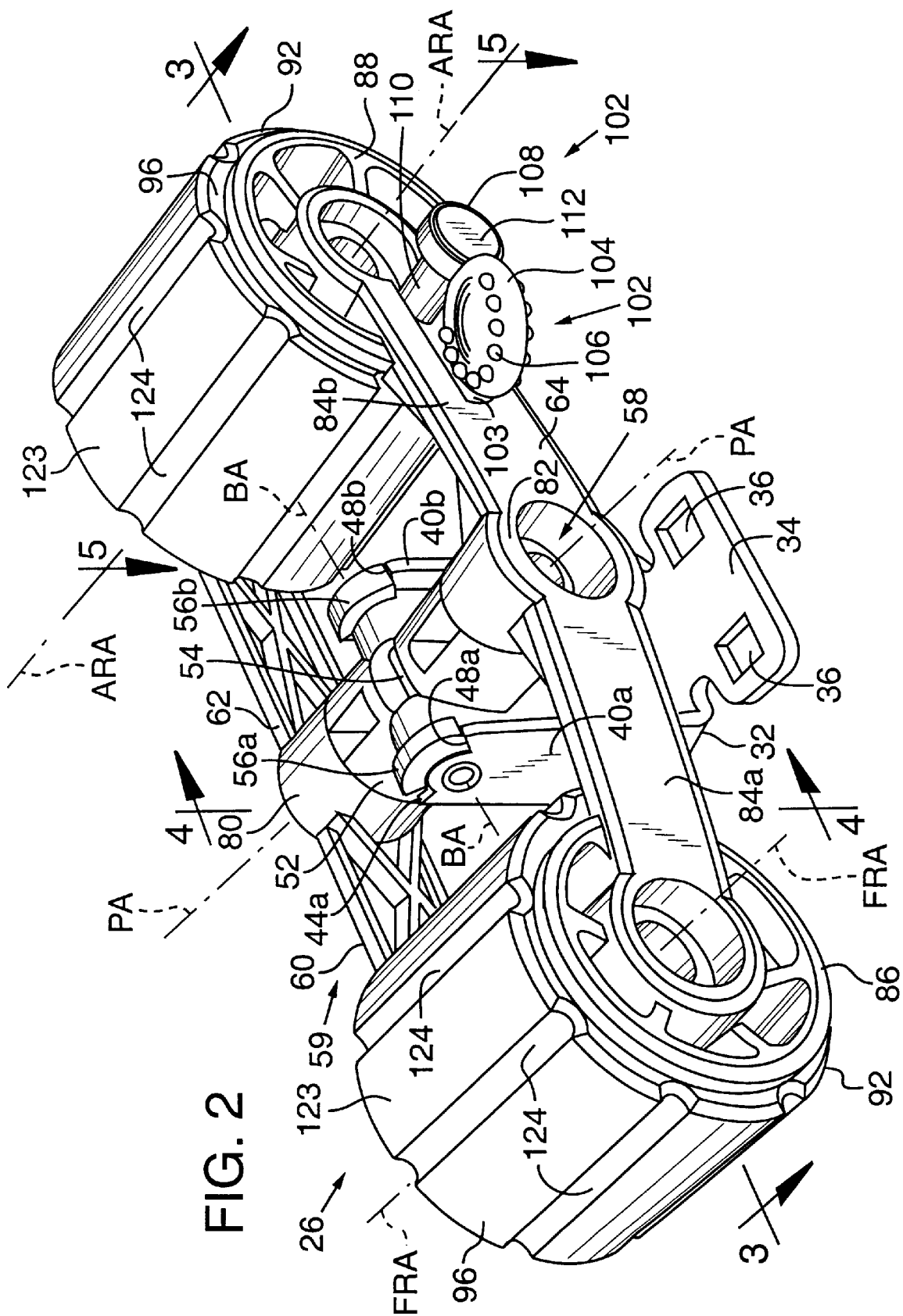

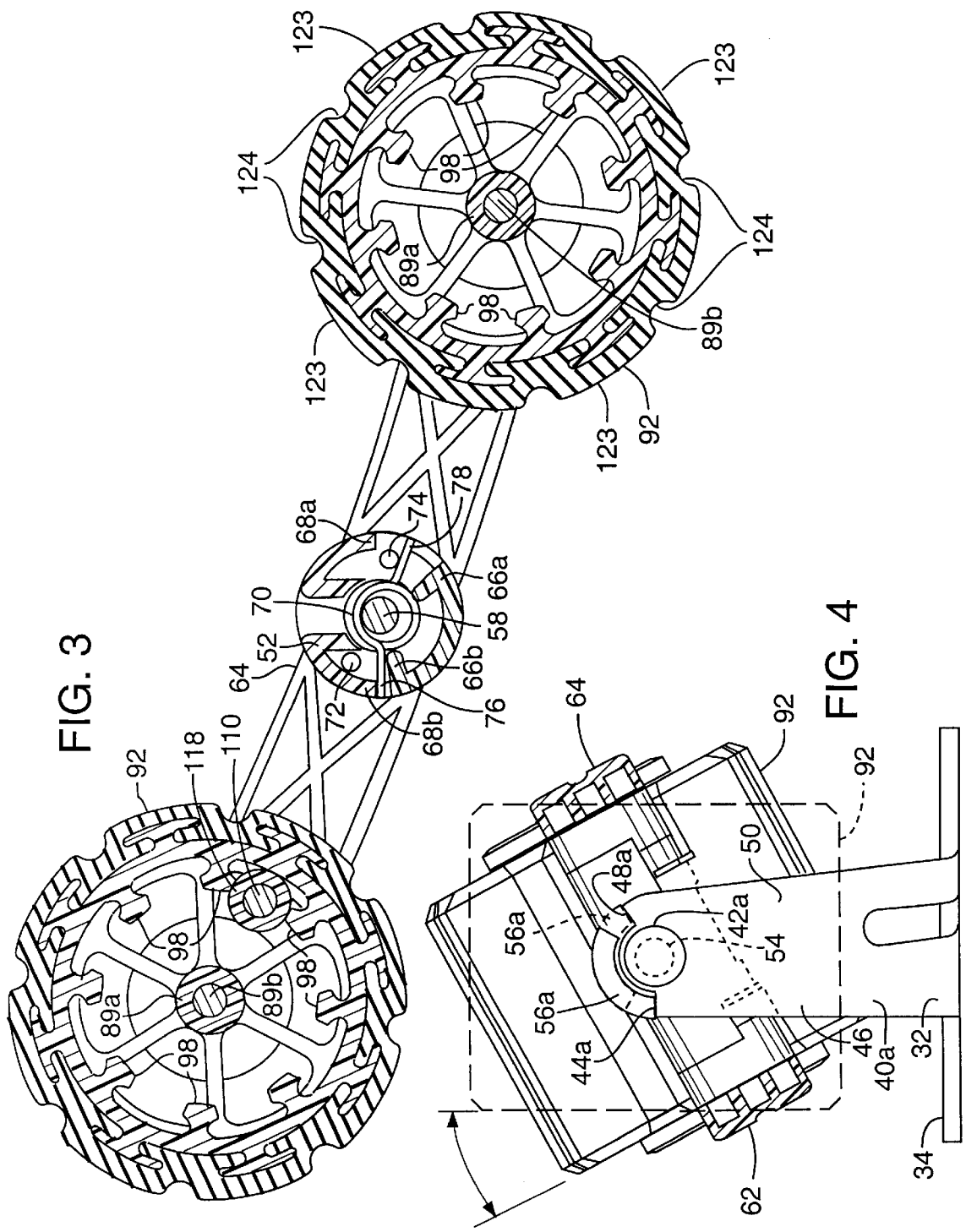

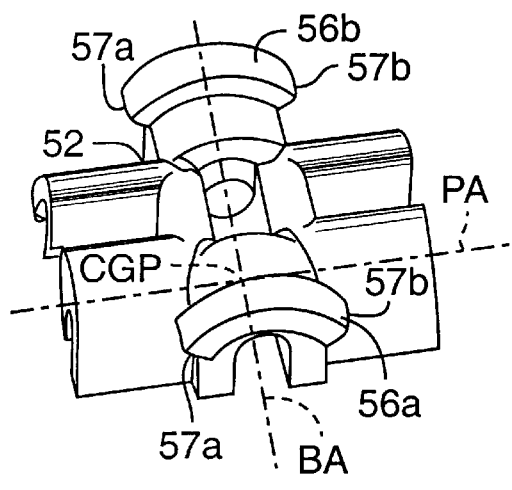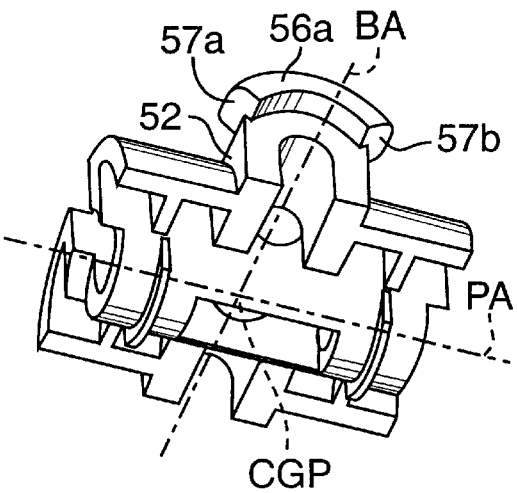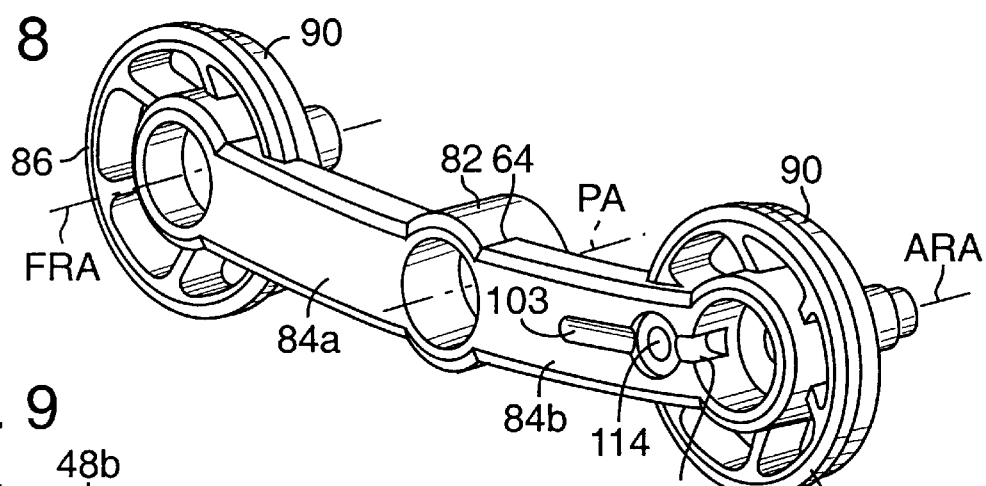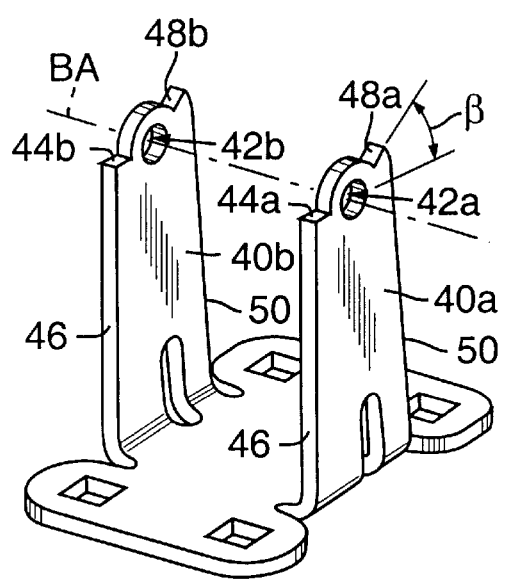

VEHICLE ROOF RACK AND BOAT MOUNTING SYSTEM

BACKGROUND AND SUMMARY OF THE INVENTION

This invention relates to a mounting system for supporting a boat out of water. More specifically, this invention relates to a boat mounting system for loading, supporting, transporting and unloading a boat onto, on and from a vehicle roof.

Boats are generally transported overland either on top of a vehicle or on a trailer drawn behind the vehicle, depending, in part, on the size of the boat relative to the vehicle, with smaller boats being more amenable to roof-top transport. The vehicle roof or trailer adapted to receive the boat is usually provided with a system of mounting elements such as rollers, chocks or bunks. The mounting elements ideally are placed and configured so as to support the boat evenly and to mount the boat as closely as possible to the vehicle roof or trailer chassis consistent with avoidance of inadvertent contact between the boat and the roof or trailer. However, evenly balanced support and close mounting are difficult to achieve together. On the one hand, the divergent shapes of various boat's hulls confound attempts to design a mounting system that maintains conformal engagement over a large surface area of the hull for many different boats. On the other hand, the trailer-mounting systems which have been designed to conform to a variety of different hull shapes require complicated and unwieldy mounting systems which raise the boat far above the trailer chassis. A need exists for a vehicle roof rack or trailer with a system of compact, re-configurable mounting elements which are maneuverable in pitch and bank and conform to variously-shaped boat hulls and which, at the same time, safely dispose the boat in a secured position as closely as possible to the vehicle roof or trailer chassis to minimize the total profile of the boat on the vehicle or trailer.

Boats are generally loaded on a vehicle's roof by one or more persons lifting the boat up and over the vehicle onto the mounting system. Boats are generally loaded on a trailer by partially submerging the trailer at a boat ramp just deeply enough so that the boat can be partially floated and partially dragged over the mounting system. The boat is then tied to the trailer and the trailer is drawn up the boat ramp, settling the boat fully on the mounting system. For both roof and trailer mounting, the boat-contacting surface of each mounting element is made of a soft, smooth material that minimizes scratching of the hull during loading and transporting. The boat-contacting surface may have a low frictional coefficient, allowing the boat to slide freely over the surface, or, the mounting elements may have a high frictional coefficient and be designed to roll as the boat passes over the element, providing a non-damaging, frictional engagement of the boat. Neither of these types of elements, as designed in the past, have provided a combination of an easy-rolling loading engagement of the boat together with a loaded engagement of the boat hull that is generally fixed against longitudinal and lateral movement of the boat. Therefore, the boat has been required to be secured against such movement in a horizontal plane in addition to requiring securing against upward movement. A need exists for a boat mounting system that allows easy loading, even by a single person, and that also secures the boat against movement in the horizontal plane.

Kayaks are a popular type of small boat that are typically stored out of water and, thus, require frequent loading and transporting overland. Kayaks, especially the one-person versions, are preferably capable of being loaded on a vehicle roof by a single person. One method of loading such a boat on the vehicle roof is for the person to carry the boat to a point in front of behind the vehicle and to lift one end of the boat onto a simple row of rollers rotatably carried directly on a cylinder rigidly secured across the vehicle roof. Holding the other end of the boat, the person pushes the boat along the rollers until the boat is in a balanced position for transporting with the boat resting entirely on the rollers. Finally, the person secures the boat to the vehicle roof or rack using ropes, bungee cords or straps. To unload the boat, the process is reversed.

To make loading and unloading of the boat as convenient as possible, and to conform the mounting elements to the shape of the boat's hull, the mounting elements should have some degree of maneuverability. For the frictional engagement of the boat hull, the mounting elements should roll, i.e., rotate about an axis transverse to the boat-loading direction, so the boat can move lengthwise along the vehicle roof during loading and unloading. In addition, the mounting elements should tilt inwardly about a bank axis parallel to the length of the boat, so they can direct the boat to a secure position during the loading operation and conform to the side of the hull. For example, mounting elements on the left side of the boat should tilt in a clockwise direction from a horizontal position and rollers on the right side of the boat should tilt in a counter-clockwise direction from a horizontal direction. Further, the mounting elements should be pivotal in pitch to conform longitudinally to the curvature along the hull and to a temporary angling of the boat during a one-person loading operation from the front or rear of the rack. The boat should be mounted as close to the vehicle roof as possible because this lowers the center of gravity of the boat and is important for aerodynamic stability and cross-sectional wind resistance. Minimizing the total profile also reduces the risk that the vehicle/boat combination will be too high to travel under low bridges or other obstructions.

Previous attempts to minimize the mounting height of a boat compromised maneuverability of the mounting elements about the pitch and bank axes. For instance, U.S. Pat. No. 3,001,679 to Canning et al. discloses a mounting system having blocks with a relatively low profile with respect to the bar upon which they are mounted. However, the blocks are rotatable only about the bank axis. The blocks do not pitch and do not roll. As explained above, this is undesirable for a mounting system where one person must load a boat on a vehicle roof. On the other hand, U.S. Pat. No. 3,155,249 to Johnson discloses a trailer with a mounting system wherein a series of rollers are rotatable about the pitch and bank axes. The pitch axis coincides with the point of attachment to the trailer, while the bank axis lies at least several inches above the pitch axis. The axis of rotation of the individual rollers is further above the bank axis. This mounting system places the boat high above the trailer chassis. Further, many components are required to provide the two degrees of freedom.

Although rollers assist the loading/unloading operation by allowing the boat to glide lengthwise into a transporting position, the boat must then be prevented somehow from sliding lengthwise off the rollers. Previous boat mounting systems used winches to hold the boat lengthwise in place during transporting. This was satisfactory for a trailer-mounted boat but extra equipment would be needed to attach a winch to a vehicle roof. Other systems replaced the rollers with non-rotating mounting elements so that the boat would slide against the mounting elements during mounting.

Although the frictional force between the boat and the mounting elements held the boat more securely in place during transporting, the same frictional force had to be overcome when mounting the boat, thus making the loading operation more difficult. In addition, the boat could be damaged by being rubbed along the frictional mounts during loading and unloading. The boat can be strapped in place for transport but it is difficult and time-consuming to secure the boat adequately against lateral and longitudinal movement, although securing against vertical movement, if necessary because the boat is light, is considerably easier to accomplish with straps.

The rack and boat mounting system of the present invention provides a roof rack with bars running across a vehicle roof, one in the front end and one in the rear end of the roof. Roller mechanisms that can be placed as desired on the cross bars are provided with two rollers each, each roller rotatable about a transverse axis and each roller mechanism free to pivot about both a pitch axis and a bank axis. The rollers have a rubber-like outer surface that provides a frictional engagement of the boat hull. At least some of the rollers are also provided with a lock that is selectively operable by a user either to allow the rollers to roll freely during loading or to lock the rollers against rolling to secure the boat to the roof rack for transport. The pitch and bank axes of the roller mechanism are substantially coplanar with one another and also with the rolling axis of the roller.

An advantage of the present invention is that it provides a boat mount that is both capable of conforming to a wide variety of boat hulls and effective to mount the boat with a low total profile.

Another advantage of the present invention is that it provides a roller engagement of the boat hull for easy loading combined with the ability to be selectively converted to a non-rolling, secure engagement of the boat hull.

Another advantage of the present invention is that it conforms to the varying curvature of the boat hull as the boat is being loaded.

Another advantage of the present invention are the simple, modular parts, including boat mounts that can be selectively installed on and removed from a roof rack or trailer. The boat mounts are also compact and rugged to minimize the possibility of damage and to make the mounts economical.

BRIEF DESCRIPTION OF THE DRAWINGS

FIG. 2 is a perspective view of one of the boat mounts of FIG. 1 in a predetermined neutral position without a load on the mount.

FIG. 3 is a cross-sectional view of the boat mount of FIG. 2 showing a pair of rollers at a front and a rear end of the mount and a universal joint which allows the mount to be pitched about a pitch axis to a maximum front-end-pitched-down position.

FIG. 4 is a cross-sectional view of an aim of the boat mount of FIG. 2 showing the arm banked about a bank axis to a maximum inwardly banked position.

FIG. 7A is a perspective view from above of the universal joint of the mount of FIG. 2 showing a pitch axis and a bank axis.

FIG. 7B is a perspective view from below of the universal joint of the mount of FIG. 2 showing the pitch and bank axes.

FIG. 8 is a perspective view of one of the arms of the mount of FIG. 2 shown removed from the other elements of the mount.

FIG. 9 is a perspective view of a mounting frame which supports the mount of FIG. 2.

DETAILED DESCRIPTION OF THE PREFERRED AND ALTERNATE EMBODIMENTS

Figure 1:
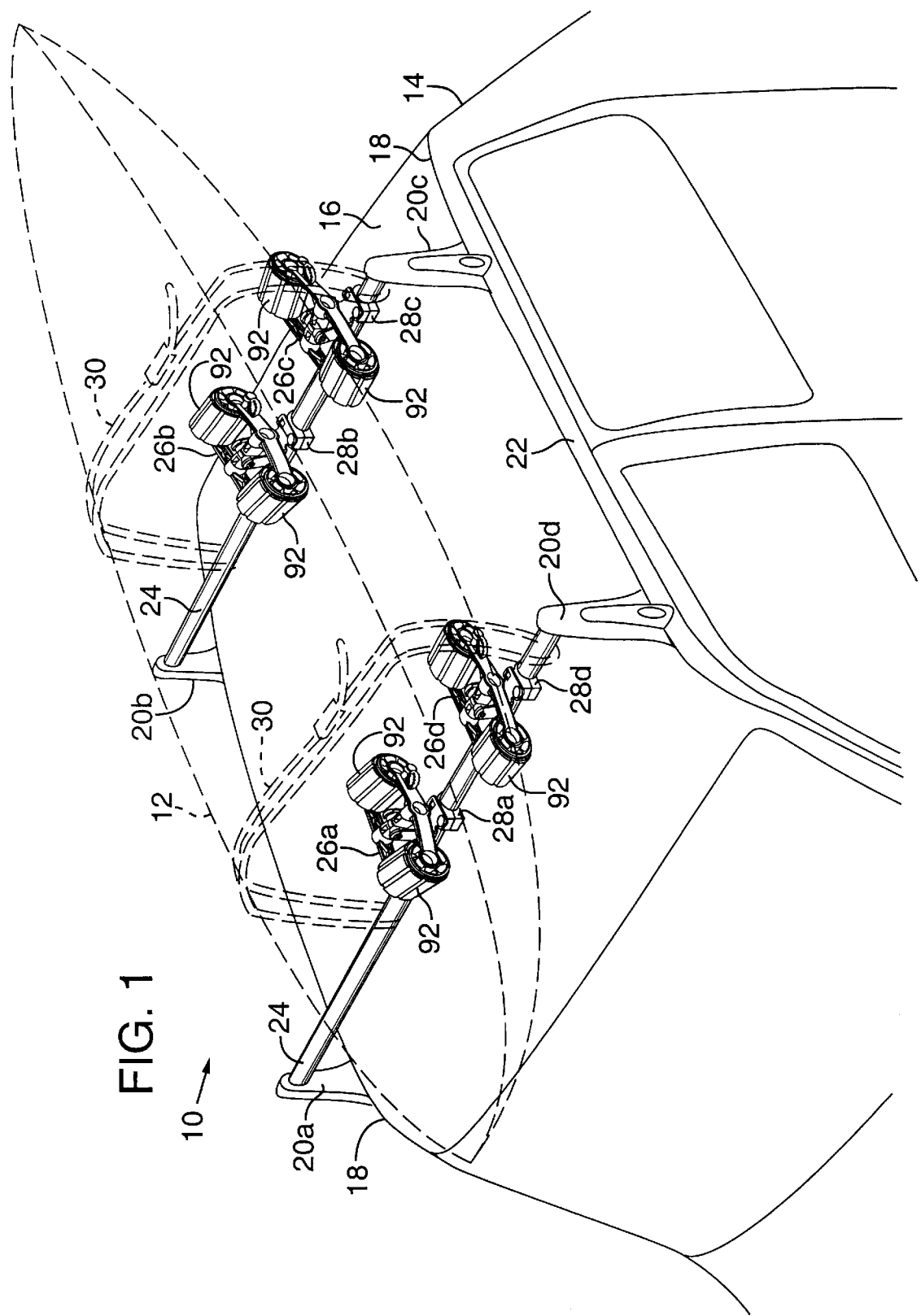
FIG. 1 is a perspective view of a roof rack and a boat mounting system according to the present invention including four boat mounts coupled to roof rack cross bars.

A roof rack and boat mounting system according to the present invention is shown in FIG. 1, indicated generally at 10, with a boat 12 secured thereon. A car 14, to which the rack is adapted to attach, has a roof 16 with rain gutters 18 running along each side of the roof The roof rack includes four roof couplers, such as towers 20a–d, mounted in rain gutters 18 in each of four comers of the roof. Alternatively, if a rain gutter is not available, a rail (not shown) may be bolted along each side of the roof, roughly in the position of rain gutters 18, and the towers may be mounted in the rail. Also, alternatively, the towers may be mounted in door seams 22 along each side of the car adjacent the roof. Fore and aft crossbars 24 are held, by and between pairs of towers 20a–d, a fixed distance above the roof. The cross bars are preferably cylindrical but may have a wing-like ellipsoid shape or other shape as well. Suitable towers, rails, and crossbars are available from Yakima, Inc. of Arcata, Calif.

A plurality of sports equipment adapters, such as boat mounts 26a–d, are rigidly coupled to the crossbars, two in front and two in the rear. Each of boat mounts 26a–d includes a crossbar grip 28a–d which is releasably attached to the crossbar. The crossbar grips shown in FIG. 1 accommodate a cylindrical crossbar, but, could alternatively be configured for a wing, or other shape of crossbar, as noted above. The position of each of the towers, crossbars and boat mounts can be adjusted to accommodate the length and width of boat 12. As shown in FIG. 1, four boat mounts are sufficient to support boat 12, although greater or fewer units could be used. The boat is further secured to the crossbars and boat mounts by a pair of adjustable straps 30, one per crossbar. Straps 30 are configured primarily to hold the boat down and prevent upward movement of the boat. Of course, as the strap is adjusted to hold the boat tightly against the boat mounts, lateral and longitudinal movement of the boat are also prevented.

FIG. 2 shows a single boat mount, indicated generally at 26, absent the crossbar grip. Boat mount 26 includes a mounting frame 32, formed of a sturdy material such as steel which has a flat base 34 with four square bolt holes 36 (two of which are shown). Bolt holes 36 are each configured to receive a square-necked bolt 38 (FIG. 10) which attaches crossbar grips 28a–d to mounting frame 32 at base 34. Rising from base 34 on mounting frame 32 are two pedestals 40a, b. Each pedestal 40a, b includes a circular aperture 42a, b, best seen in FIG. 9, adjacent an upper end of the pedestal. Apertures 42a, b are aligned collinearly with one another. As shown in FIG. 9, the top of each pedestal also includes a pair of side-to-side asymmetrical stops: a lower pair 44*a, b* on an inner side 46 of each pedestal and a higher pair 48*a, b* on an outer side 50 of each pedestal. The outer stops are offset above the inner stops by angle β, which is preferably about 27°.

As shown in FIG. 2, boat mount 26 further includes a gimbal, such as universal joint 52, preferably made of molded nylon, which is coupled to, and supported by, mounting frame 32 on an axle 54, preferably made of steel, which extends longitudinally through universal joint 52 and is pivotally held at each end in apertures 42*a, b*. Axle 54 allows universal joint 52 to rotate about a bank axis BA (best seen in FIGS. 7A, B) which extends in a direction generally parallel to the length of the car. Universal joint 52 includes two wedge-shaped limiters 56*a, b*, each having edges 57*a, b*, the limiters riding in between the stops on pedestals 40*a, b*, respectively, as the universal joint pivots about the bank axis. Universal joint 52 also includes a transverse axle 58, preferably made of steel, which is held in universal joint 52 just below longitudinal axle 54 and which extends along a pitch axis PA (FIGS. 7A, B) which is preferably substantially perpendicular to, but at least non-parallel to, and substantially coplanar with, bank axis BA. Pitch axis PA, in the preferred embodiment, is below bank axis BA by a distance slightly greater than the sum of one-half the diameter of axle 54 and one-half the diameter of axle 58, but, that is within the definition of substantially coplanar as used herein. The pitch and bank axes roughly intersect at a central gimbal point CGP which is defined as being large enough to encompass a central portion of both axes within the universal joint.

Boat mount 26 also includes a boat support, such as a roller mechanism, indicated generally at 59, which includes a roller support 60 comprising two parallel arms 62, 64, preferably made of fiber-reinforced, molded plastic, pivotally coupled to universal joint 52 at transverse axle 58. Axle 58 includes a head (not shown) at one end and a lip (not shown) at the opposite end so that axle 58 is also operable to hold parallel arms 62, 64 together and attached to universal joint 52. Thus, roller support 60 is allowed, through universal joint 52, to pivot with two degrees of freedom about pitch axis PA and about bank axis BA and about central gimbal point CGP. As seen in FIG. 3, roller support 60 is limited in pivoting about pitch axis PA by a pair of stops 66*a, b* formed on arm 64. Stops 66*a, b* are shown with arm 64 pivoted to the maximum limit in one direction. An identical pair of stops (not shown) are formed on arm 62. Universal joint 52 includes limiters 68*a, b* which come into contact with stops 66*a, b*, respectively, when roller support 60 is pivoted about pitch axis PA. Similar limiters (not shown) are provided opposite on universal joint 52 for arm 62. Stops 66*a, b* preferably constrain the pivoting of roller support 60 about pitch axis PA generally symmetrically to about 30° in each direction. Alternatively, a larger or smaller pitch range may be provided by reconfigured stops and limiters for a wider range of boat hull shapes and loading angles. A biasing mechanism, such as torsion spring 70, is interposed between parallel arm 64 and universal joint 52. A pair of tabs 72, 74 are formed on arm 64 to hold in place ends 76, 78 of spring 70 when the spring is tensioned by the roller support pivoting about the pitch axis.

As seen in FIG. 2, when the roller support is unloaded, it is nominally put into a predetermined neutral position with respect to the pitch and bank axes by the operation of spring 70 and stops 48*a, b*. Spring 70 preferably urges the roller support to a generally level position about the pitch axis in the predetermined neutral position. Since the roller support is generally symmetrical and balanced about the bank axis, the outer edges of limiters 56*a, b* would, absent stops 48*a, b*, naturally rest at about 30° above level, thus leveling the roller support. However, stops 48*a, b*, on pedestals 40*a, b*, which are preferably raised about 33° above level, cooperate with limiters 56*a, b*, outer edge 57*b* of each of which is preferably raised about 30° above level, to tilt or bank the roller support about 3° inwardly from level about the bank axis in the predetermined neutral position.

FIG. 4 shows that the roller support preferably can be rotated inwardly about 27°, as constrained by stop 44*a*, which is raised about 3° above level, and limiter 56*a*, inner edge 57*a* of which is nominally about 30° above level. Alternatively, a larger or smaller bank range may be provided by reconfigured stops and limiters for a wider range of boat hull shapes. The roller support is thus capable, in a boat-loading operation, of receiving and accommodating the boat hull by pivoting on the universal joint about the two substantially coplanar and substantially non-parallel axes of rotation, i.e., the pitch and bank axes. The advantage of such a roller support is that it is adaptable to conform both to the varying curvature from end-to-end of each boat hull and to a variety of boat hulls.

FIG. 2 shows that arms 62, 64 are pivotally mounted on axle 58 at mounting hubs 80, 82, respectively. On arm 64 (and similarly on arm 62 and for all roller mechanisms) arm portions 84*a, b* extend fore and aft, respectively, from mounting hub 82. A forward wheel rim 86 is rigidly coupled at the forward end of arm portion 84*b* and a rear wheel rim 88 is rigidly coupled at the aft end of arm portion 84*b*. The wheel rims, mounting hubs and fore and aft arm portions are preferably formed together in a single molding process.

Figure 5:
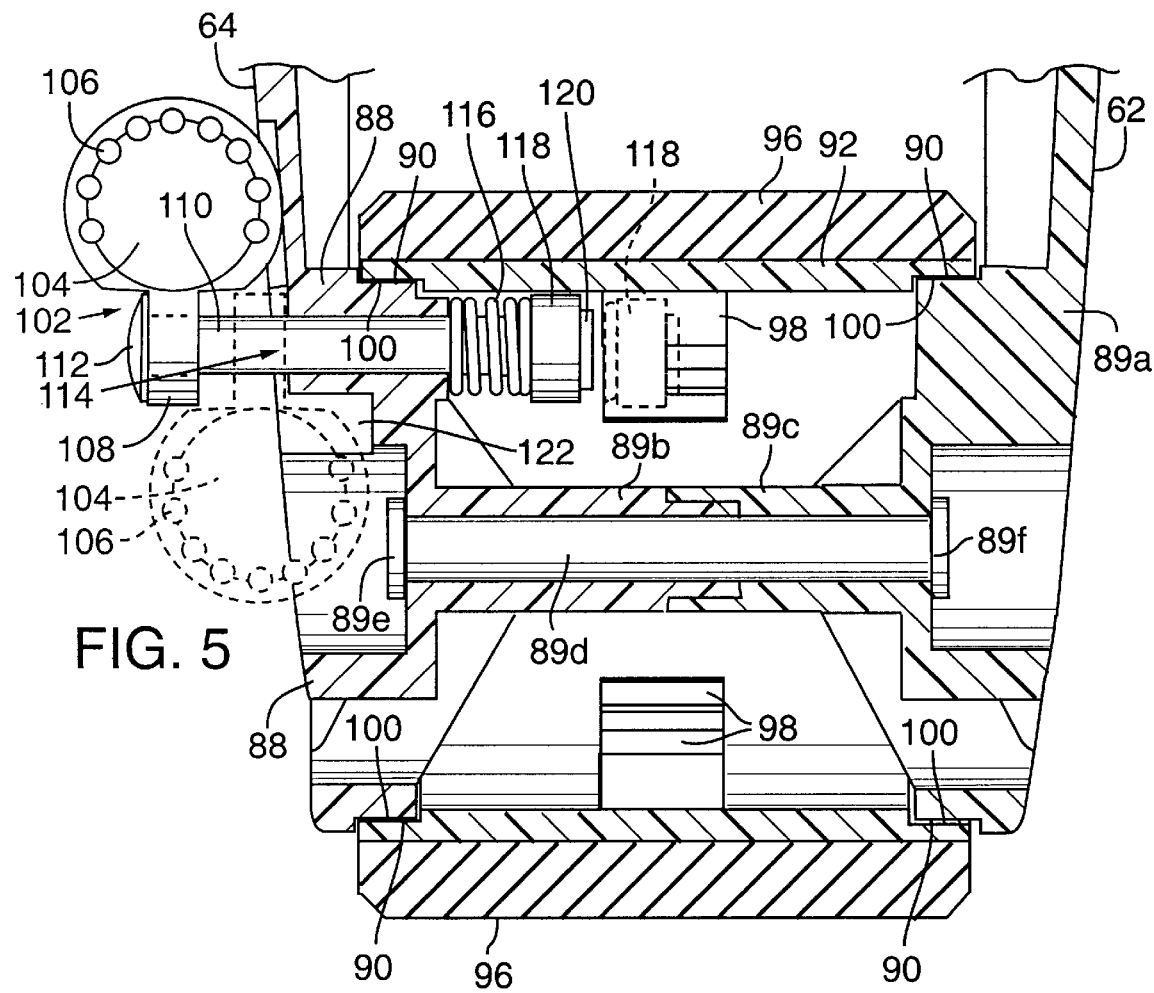
FIG. 5 is a cross-sectional view of one of the rollers of the mount of FIG. 2 showing a lock operable to prevent selectively the roller from rotating about a roller axis.

As shown in FIG. 5, wheel rim 88 on arm 62 and opposing wheel rim 89*a* on arm 64 each include an axially-extending, central channel structure 89*b, c* with the channels meeting in between the opposing wheel rims. An axle 89*d*, held in channel 89*a*, includes a head 89*e* at one end and a lip 89*f* at the opposite end to hold the opposing rims together.

Figure 6:
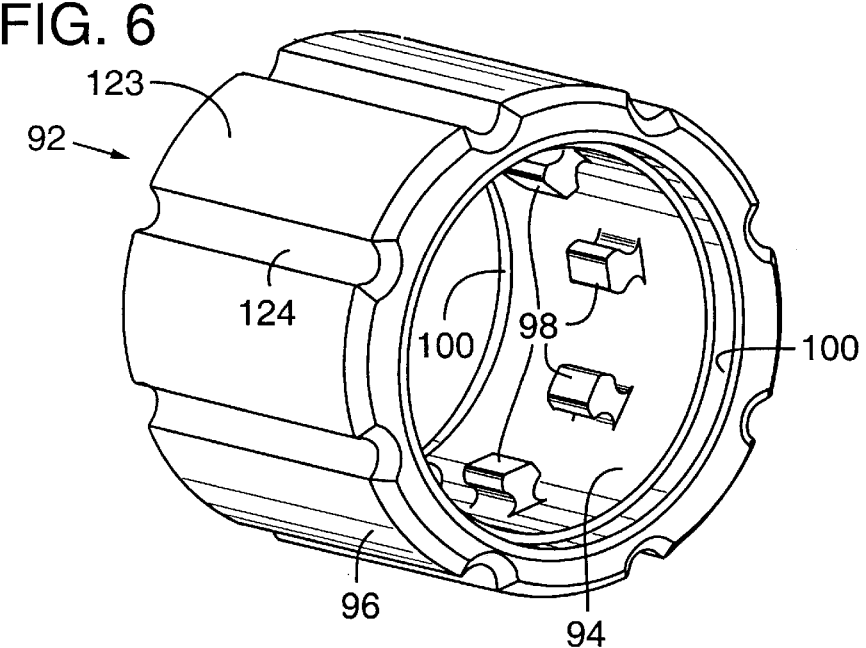
FIG. 6 is a perspective view of one of the rollers of the mount of FIG. 2 removed from the boat mount showing an outer tire and internal, inwardly radiating spline elements.

As best seen in FIG. 8, both wheel rims 86, 88 include a bearing surface, such as annular structure 90, on the inside of the wheel rim, adapted to mount a roller 92, best seen in FIG. 6. Roller 92 comprises a generally cylindrical tube 94, a tire 96, made of a rubber-like material such as Kraton, wrapped around tube 94, and a plurality of internal spline elements 98 extending radially inwardly inside tube 94. Each roller mechanism 59 includes two of rollers 92 mounted on opposed pairs of wheel rims fore and aft of the universal joint. Each of two outer edges 100 of each tube 94 bears on one of the annular structures 90 in the wheel rims of arms 62, 64 so that each of the two rollers 92 of roller mechanism 59 is rotatable with respect to the roller support about one of two rolling axes, a front rolling axis FRA and an aft rolling axis ARA (FIG. 2). As seen in FIG. 2, rolling axes FRA, ARA are substantially coplanar with the axes of rotation of the roller support BA, PA when the roller support is in the predetermined neutral position. Rolling axes FRA, ARA are also substantially parallel to one another.

Roller mechanism 59 includes a lock, indicated generally at 102 in FIG. 2, which is operable by a user to prevent selectively the rotation of aft roller 92 about its rolling axis. Preferably, the lock is applied to one of the rollers on each boat mount. Alternatively, both rollers on boat mount 26 may include lock 102. In FIG. 2, lock 102 is shown in an open or withdrawn position wherein the roller is free to rotate. The lock includes a manual tab 104 with a plurality of purchase-enhancing bumps 106. Tab 104 in the open position rests in a groove 103 on arm 64.

As best shown in FIG. 5, manual tab 104 includes a collar 108 which captively holds a bolt 110 at bolt head 112. Bolt 110 extends through an aperture 114 in wheel rim 88 into the interior of the wheel rim. In the withdrawn position, a locking spring 116 carried on bolt 110 is compressed against wheel rim 88 by a washer 118 held on bolt 110 by a lip 120 at the end of bolt 110. As seen in FIG. 5 in solid line, the bolt in the withdrawn position is clear of spline elements 98 within roller 92. As shown in FIG. 5 in dashed line, the manual tab may be rotated to a roller locking position wherein the manual tab rests in a notch 122 in wheel rim 88 and bolt 110 is urged by locking spring 116 to a position with washer 118 between internal spline elements 98, thus preventing rotation of the roller about the rolling axis. The boat mount of the present invention thus provides a combination of an easy-rolling loading engagement of the boat hull and a loaded engagement wherein the boat hull is generally fixed in the horizontal plane against lateral and longitudinal movement. The horizontally-fixed, loaded engagement increases the effectiveness of straps 30 to secure the boat against movement in all three dimensions because the straps' securing of the boat against vertical movement presses the boat hull against the fixed rollers, thus increasing the rollers' ability to secure against horizontal movement.

As shown in FIG. 2, an outer surface 123 on each tire 96 of rollers 92 includes a plurality of transverse grooves 124 which are formed in the surface and run roughly parallel to the roller axis. The grooves are believed to be useful when loading a muddy kayak because the grooves provide a channel for some of the dirt and water, resulting in a cleaner and, therefore, more frictional engagement between the roller and hull.

Figure 10:
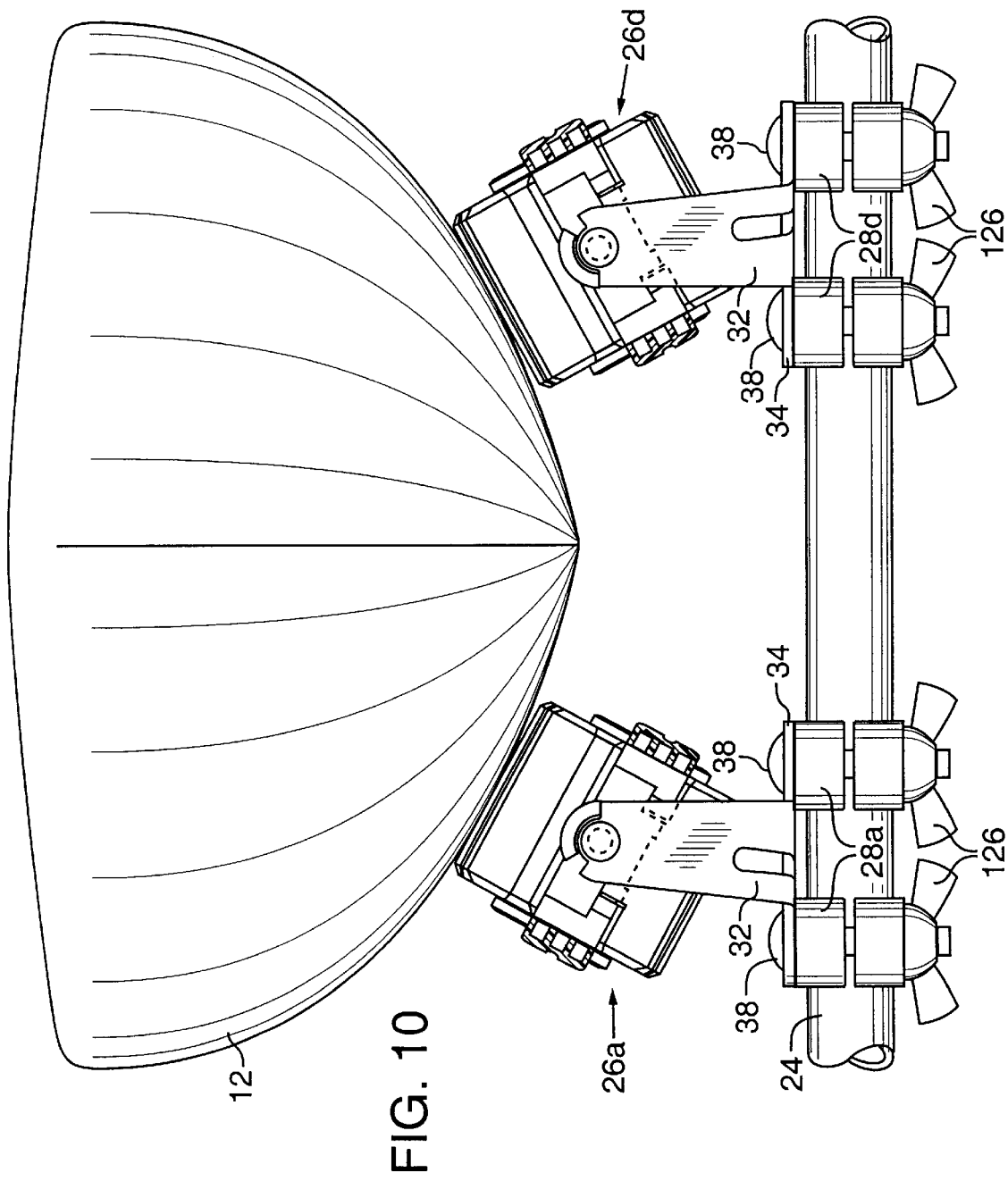
FIG. 10 is a front elevation of one crossbar of the roof rack and boat mounting system of FIG. 1 showing wing nuts holding crossbar grips which support the mounts at the mounting frames.

FIG. 10 shows two crossbar grips 28a, d on each of two boat mounts 26a, d, coupling the boat mounts to crossbar 24. Bolt 38 in each of crossbar grips 28 is held in place, and grips 28a, d are clamped onto crossbar 24, by hand-tightened wing nuts 126, one per bolt. Wing nuts 126 allow grips 28a, d and all grips and mounts attached to crossbars 24 to be easily repositioned along the crossbars to accommodate wider or narrower boats.

While the present invention has been shown and described with reference to the foregoing preferred and alternate embodiments, it is to be understood by those skilled in the art that other changes in form and detail may be made therein without departing from the spirit and scope of the invention as defined in the appended claims.

I claim:

1. A vehicle-top roof rack and boat mounting system for mounting a boat atop a roof of a vehicle, the rack and mount comprising:

a plurality of roof couplers attachable on the vehicle roof;

a plurality of crossbars attachable to the roof couplers; and a boat mounting system comprising a plurality of boat mounts, each mount comprising a crossbar grip coupled to the crossbar, a mounting frame coupled to the grip, a gimbal coupled to the mounting frame, and a roller support coupled to the gimbal, the gimbal generally allowing the roller support to pivot about first and second axes of rotation with two degrees of freedom about a central gimbal point, the gimbal including a biasing mechanism operating about the first axis of rotation and a stop operating about the second axis of rotation, the first and second axes of rotation being non-parallel and substantially coplanar along their respective lengths the biasing mechanism and the stop together putting the roller support in a predetermined neutral position.

2. A vehicle-top boat mount comprising:

mounting structure securable to a vehicle roof;

a mounting frame securable to the mounting structure;

a universal joint connected to the mounting frame; and a roller mechanism connected to the universal joint, the roller mechanism including a roller support which is pivotal, with respect to the mounting frame, through the universal joint, about two non-parallel axes of rotation that are substantially coplanar along their respective lengths, the roller mechanism further including a first roller mounted on the roller support, the first roller being rotatable, with respect to the roller support about a first rolling axis.

3. The boat mount of claim 2 wherein the roller support is nominally biased to a predetermined neutral position.

4. The boat mount of claim 3 further comprising a spring for biasing the roller support about one of the axes of rotation to the predetermined neutral position.

5. The boat mount of claim 3 further comprising a stop for nominally limiting the roller support's rotation about one of the axes to the predetermined neutral position.

6. The boat mount of claim 2 wherein the roller mechanism further comprises a second roller mounted on the roller support the second roller rotatable, with respect to the roller support, about a second rolling axis.

7. The boat mount of claim 6 wherein the roller support comprises first and second parallel arms which rotatably support the first roller at the first rolling axis and the second roller at the second rolling axis.

8. The boat mount of claim 6 wherein the first and second rolling axes are substantially coplanar with the axes of rotation of the roller support when the roller support is in a predetermined neutral position.

9. The boat mount of claim 2 further comprising a stop for limiting rotation of the roller support about one of the axes of rotation.

10. The boat mount of claim 9 wherein the roller support in the predetermined neutral position is substantially limited by the stop from rotating in one direction but allowed to rotate in an opposite direction.

11. The boat mount of claim 2 wherein the roller support comprises first and second parallel arms which rotatably support the first roller about the first rolling axis.

12. The boat mount of claim 2 further comprising a lock operable by a user selectively to prevent rotation of the first roller about the first rolling axis.

13. The boat mount of claim 12 wherein the first roller includes a plurality of internal spline elements and wherein the lock comprises a manual tab mounted on the roller support and a bolt connected to the manual tab, wherein the manual tab is operable to selectively move the bolt between the internal spline elements, thereby preventing the first roller from rotating about the first rolling axis with respect to the roller support.

14. The boat mount of claim 13 wherein the tab is selectively movable to a roller locking position wherein a spring coupled to the bolt urges the bolt between the internal spline elements, thereby preventing the first roller from rotating about the first rolling axis with respect to the roller support.

15. The boat mount of claim 2 wherein the roller support is nominally biased to a predetermined neutral position with the first rolling axis substantially coplanar with the roller support's axis of rotation.

16. The boat mount of claim 2 wherein an outer surface of the roller includes a plurality of transverse grooves.

17. A vehicle-top boat mount operable to provide support to a hull of a boat, the mount comprising:

mounting structure configured to be secured to a vehicle roof;

a mounting frame securable to the mounting structure;

a gimbal supported by the mounting frame; and a boat support configured to support the boat hull, the support coupled to the gimbal, the gimbal generally allowing the support to pivot with two degrees of freedom about a central gimbal point, the support, during a boat-loading operation, receiving the boat hull and accommodating the shape of the boat hull by pivoting on the gimbal about two non-parallel axes of rotation that are substantially coplanar along their respective lengths.

18. The boat mount of claim 17 wherein the boat support further comprises a first roller rotatable about a first rolling axis, the first roller operable to engage frictionally the boat hull and to roll as the boat hull passes over the first roller during the loading operation.

19. The boat mount of claim 18 wherein the boat support further comprises a lock selectively operable by a user to lock the first roller to prevent rotation about the first rolling axis.

20. The boat mount of claim 18 wherein the boat support further comprises a second roller rotatable about a second rolling axis, the second roller operable to engage frictionally the boat hull and to roll as the boat hull passes over the second roller during the loading operation.

21. The boat mount of claim 20 wherein the second rolling axis is substantially parallel to the first rolling axis.

22. The boat mount of claim 18 wherein the first rolling axis is substantially coplanar with the axes of rotation of the boat support when the boat support is in a predetermined neutral position.

23. The boat mount of claim 18 wherein the boat support further comprises an annular structure and the first roller bears on the annular structure to rotate about the first rolling axis.

24. The boat mount of claim 18 further comprising a biasing mechanism operating about one of the two axes of rotation to urge the boat support to a predetermined neutral position.

25. The boat mount of claim 24 further comprising a stop operating about the other axis of the two axes of rotation, the biasing mechanism and the stop together putting the roller support in the predetermined neutral position.

26. A boat mount for frictionally engaging a boat on a vehicle roof, the mount comprising:

first and second towers respectively attachable proximal opposite lateral sides of the roof;

a crossbar extending across the roof between the towers; and a roller mechanism coupled to the crossbar, the roller mechanism including a roller support and a roller positioned to contact the boat and mounted on the roller support, the roller being rotatable, with respect to the roller support, about a rolling axis, the roller mechanism further including a lock operable by a user selectively to prevent rotation of the roller about the rolling axis.

* * * * *